United States Patent [19]
Chan et al.

[11] 3,914,302
[45] Oct. 21, 1975

[54] PROCESS FOR THE PRODUCTION OF N,N-DIALLYLDICHLOROACETAMIDE

[75] Inventors: Jimmy Hua-Hin Chan; Jules Kalbfeld, both of Pinole; John Albert Kostecki, San Rafael; Harold Mahonrai Pitt, Lafayette; Donald Lawrence Seitas, Mill Valley, all of Calif.

[73] Assignee: Stauffer Chemical Company, Westport, Conn.

[22] Filed: Jan. 31, 1974

[21] Appl. No.: 438,304

[52] U.S. Cl............... 260/561 HL; 260/561 R
[51] Int. Cl.² .............. C07C 103/02; C07C 103/34
[58] Field of Search ..... 260/561 HL, 561 R; 71/118

[56] References Cited
UNITED STATES PATENTS 3,268,324  8/1966  Hamm et al............. 260/561 HL
3,287,106  11/1966  Chupp.................... 260/561 HL
3,719,466  3/1973  Ahle ....................... 71/118

Primary Examiner—C. Davis
Attorney, Agent, or Firm—Michael J. Bradley

[57] ABSTRACT

A novel process is described herein for the efficient production of N,N-diallyldichloroacetamide by reaction of diallylamine and dichloroacetyl chloride. The process comprises admixing an excess of diallylamine with sufficient strong aqueous sodium hydroxide such that at all times during the reaction, the pH of the reaction mixture remains above a pH of 10, then slowly adding dichloroacetyl chloride to said mixture under violent agitation, while maintaining the reaction temperature from about −10 to about 100°C to effect production of N,N-diallyldichloroacetamide in yields in excess of 80 percent, while eliminating the production of amine salt by-products.

23 Claims, No Drawings

PROCESS FOR THE PRODUCTION OF N,N-DIALLYLDICHLOROACETAMIDE

BACKGROUND OF THE INVENTION

The reaction of an amine with an acid chloride compound to produce an amide has long been known in the art. Since the reaction is exothermic, it has, at times, been conducted in ice baths or similar cooling devices to withdraw the heat of reaction and minimize temperature increase during the reaction. Such reactions have also been carried out in the presence of caustic, such as sodium hydroxide to neutralize hydrochloric acid produced during the reaction and to prevent the reaction mixture from becoming too acidic. The examples of U.S. Pat. No. 2,864,683 demonstrate several of these reaction techniques for the production of amides from amines and acid chlorides.

The conventional reactions for producing amides from amines and acid chlorides suffer from two major problems. First, they tend to produce an excessive amount of amine salts such as amine hydrochlorides, dichloroacetic acid by-products, etc., as by-products of the reaction and second, the acid chlorides react with water to produce acids with the result that both the amines and the acid chloride are being removed from the system independently by formation of unwanted by-products, thereby lowering overall yields from theoretical yield.

BRIEF DESCRITPION OF THE INVENTION

It has been discovered that N,N-diallyldichloroacetamides can be produced at near theoretical yields while producing essentially no amine salt or dichloroacetic acid as by-products and contaminants as a result of the reaction process by use of a process whereby an excess of diallylamine is mixed with sufficient 5 to 80 percent aqueous sodium hydroxide such that at all times during the reaction the pH of the reaction mixture remains above a pH of 10, and then slowly adding dichloroacetyl chloride to the violently agitated mixture of diallylamine and aqueous sodium hydroxide while maintaining the temperature of the reaction mixture from about −10 to about 100°C, whereby N,N-diallyldichloroacetamide is produced in yields above 80 percent having essentially no amine salt or dichloroacetic acid as by-products and contaminants.

DETAILED DESCRIPTION OF THE INVENTION

The compound N,N-diallyldichloroacetamide is useful as an antidote to protect certain crop plants from herbicidal injury caused by the application of thiocarbamate herbicides, such as some examples of which are described and claimed in the U.S. Pat. Nos. 2,913,327, 3,037,853, 3,175,897, 3,185,720, 3,198,786 and 3,582,314. In the formulation step in preparing the thiocarbamate and N,N-diallyldichloroacetamide antidote for sale, a serious problem that has occurred is the formulation of a gel which is very stable and refuses to break down.

It has been discovered that the compound causing the gel formation is a by-product of the reaction to produce N,N-diallyldichloroacetamide. These compounds are various amine salts of which N,N-diallylaminedichloroacetate comprises the major constituent. To prevent this gel formation, on formulation of the thiocarbamate herbicide and N,N-diallyldichloroacetamide antidote, it is necessary to minimize, if not eliminate completely, the formation of amine salts during the reaction process to produce N,N-diallyldichloroacetamides.

It has been discovered that N,N-diallyldichloroacetamide free of amine salts can be produced by the process whereby an excess of diallylamine (DAA) is mixed with sufficient 5 to 80 percent aqueous sodium hydroxide such that at all times during the reaction to produce said amide, the pH of the reaction mixture remains above a pH of 10, followed by slowly adding dichloroacetylchloride (DCAC) to said sodium hydroxide and amine mixture under violent agitation conditions while maintaining the temperature of the reaction mixture from about −10° to about 100°C to effect the production of N,N-diallyldichloroacetamide essentially free of amine salts in yields above 80 percent of theoretical.

In the prior art, the reaction mixture for the amine and acid chloride had been formed in a suitable organic solvent such as ethylene dichloride or benzene with sufficient dilute sodium hydroxide to maintain the pH at approximately 8. The process of the present invention utilizes an excess of diallylamine mixed with aqueous sodium hydroxide, from about 5 to about 80 percent aqueous sodium hydroxide to minimize water in the reaction mixture, thus minimizing the volume of the total reaction mixture and minimizing agitation and transport problems while also maintaining the pH above 10. The aqueous NaOH can be added to the diallylamine in several equal or unequal fractions followed by addition to the reaction mixture of an equal fraction or proportion of the dichloroacetyl chloride to further minimize water in the total reaction system which also minimizes DCAC losses due to hydrolysis.

It is preferred that the sodium hydroxide concentration be from about 15 to about 50 percent aqueous sodium hydroxide but most preferably from about 17 to about 20 percent aqueous sodium hydroxide and that preferably the pH of the resultant reaction mixture be maintained at between a pH of 11 to 13.

The reaction can be carried out at from about −10° to about 100°C, more preferably from about 0° to about 70°C, more preferably yet from about 20°C to about 70°C, even more preferably from about 20° to about 50°C and specifically most preferably at about 30°C. As the reaction temperature increases less sophisticated cooling apparatus is required to maintain desired reaction conditions.

Of particular importance to the ultimate separation of the N,N-diallyldichloroacetamide from the total reaction mixture is the original charge to the reaction vessel. The molar charge ratio is important to achieve proper phase separation of the reaction mixture on completion of the reaction. When the molar ratio DCAC and DAA charged to the reaction vessel are equal as would be dictated by stoichiometric chemistry, there is no phase separation between the organic and the aqueous portions of the reaction mixture after completion of the reaction, complicating the ultimate separation of the mixture due to the emulsion of the two phases. Another problem is that if the sodium hydroxide concentration becomes too high, a third insoluble phase will precipitate from the reaction mixture, further complicating separation techniques. This phase of precipated salts can be dissolved by addition of more water after completion of the reaction.

It has been discovered that if the dichloroacetyl chloride to diallylamine molar ratios are from about 0.7:1.00 to about 0.95:1.00, the excess diallylamine acts as a diluent and solvent for the N,N-diallyldichloroacetamide that is formed by the reaction process and the reaction mixture separates into at least two phases. The caustic (NaOH) charged to the reactor can range from about 1.05 to about 1.25, preferably from about 1.09 to about 1.2 calculated as 100% NaOH. The most preferred charge ratio being:

$$\frac{DCAC: DAA: 100\% \ NaOH}{0.86: 1.00 : 1.10}$$

Due to the competing side reaction in which the dichloroacetyl chloride will react with the water present in the aqueous sodium hydroxide, a thorough and violent mixing of the diallylamine-sodium hydroxide mixture must be achieved and maintained during the addition of the dichloroacetyl chloride to minimize that side reaction with water.

To be commercially feasible, addition of the dichloroacetyl chloride must be quite rapid and it has been discovered that mixing of the diallylamine sodium hydroxide mixture by use of a high capacity centrifugal pump achieves the desired mixing effect while allowing rapid addition of the dichloroacetyl chloride through the intake of the centrifugal pump. This technique achieves a rapid and complete reaction of the dichloroacetyl chloride with the diallylamine, while maintaining the pH at above 10 and preventing the side reaction of diallylamine to form amine hydrochlorides. Commercially the rate of addition of the DCAC should be as rapid as possible while maintaining the desired reaction temperature and pH. At whatever rate of addition of DCAC a critical factor in achieving excellent yields is extremely good mixing must be maintained.

After the phase separation is completed, the aqueous phase is discarded while the organic phase is stripped, preferably at approximately 100 mm mercury absolute pressure, preferably at a temperature of 80°C for about 1 hour or less to remove soluble or entrained water and the excess diallylamine diluent from the crude N,N-diallyldichloroacetamide. N,N-diallyldichloroacetamide is recovered having a purity in excess of 95 percent, which has as a major contaminant diallylamine and contains essentially no amine salts. The N,N-diallyldichloroacetamide is recovered at a rate of greater than 80 percent of theoretical yield, based on diallylamine charged and normally greater than 80 percent of theoretical yield based on the dichloroacetyl chloride charged. The stripping step is carried out to recover unused excess DAA and to further purify the N,N-diallyldichloroacetamide for commercial use. The stripping can be carried out in conventional stripping equipment that will maximize removal of the DAA and water while minimizing the temperature at which the stripping is conducted and minimizing the hold time of the stripping step.

This invention can be further and better understood by the following examples.

EXAMPLE 1

Into a well baffled and agitated 500 gallon reactor, having a pump around loop containing an external shell and tube heat exchanger to remove heat of reaction, was charged 191 gallons of process water. Then the agitator and pump were started. Next, 70 gallons of 50 percent NaOH was charged. Heat of dilution was removed by the external heat exchanger. When the temperature was reduced to less than 30°C, 29 gallons of diallylamine composed of 71 wt percent diallylamine and 20 wt percent water that was recovered from the previous batch was charged to the reaction vessel. Next, 853 pounds of fresh diallylamine was added, then 1300 pounds DCAC was added through the pump suction at a rate sufficient to maintain the reaction temperature at the pump discharge equal to or below 30°C. When the DCAC charge was finished, the pH was 13. Next, the resulting aqueous and inorganic two-phase mixture was allowed to separate for one hour. Then, the aqueous phase was drawn off and discarded. The upper organic phase containing crude product and containing a small amount of soluable and entrained water and excess diallylamine was transferred to intermediate storage prior to the stripping phase of the process. The crude product was then fed continuously into a falling film evaporator operated at about 100 ml Hg absolute with a resulting exit temperature of 80°c. The resulting vapor liquid mixture was then continuously fed to a packed bed column, in which the remaining water and diallylamine were removed from the N,N-diallyldichloroacetamide by counter current contact with nitrogen at a column pressure of about 100 mm mercury absolute pressure using 5°C refrigerant and the condensate containing primarily water and diallylamine is saved for a succeeding reaction charge. The product leaving the column bottom is cooled to process water temperature, filtered for solid removal and stored. The product was analyzed as containing 97 percent N,N-diallyldichloroacetamide, 0.06 percent water, and 1.0 percent diallylamine. Overall process yield was 82 percent for each starting material. Product formulated without gel formation.

EXAMPLE 2

Into a 3 liter baffled round bottom glass flask placed in an ice water bath, was charged 1450 grams of 17 percent NaOH. Next, 545 grams of diallylamine was charged. Agitation was begun in both the reaction flask and the ice water bath. When the temperature of the NaOH and diallylamine mixture was less than the desired reaction temperature (29°C), dichloroacetyl chloride was introduced via a calibrated dropping funnel and subsurface dip tube at a rate sufficient to maintain the reaction temperature at 29°C. 748 grams of dichloroacetyl chloride was charged to the reaction vessel in this manner. The molar charge ratio of dichloroacetyl chloride: diallylamine: 100 percent NaOH was 0.947:1.00:1.09. When the dichloroacetyl chloride charge was completed, the aqueous phase ph was 13.0 to 13.5. The resultant aqueous and organic twophase mixture was allowed to separate. After separation, the lower aqueous phase was withdrawn and discarded while the upper organic phase (the crude product) was transferred to a three-necked 1 liter round bottom glass flask for stripping. The crude product was heated to 70°C via a constant temperature bath. The flask was evacuated to 10–20 mm mercury absolute pressure and stripping nitrogen was added for one hour at a high rate, but below that which would entrained the liquid in the off gas. Soluble and entrained water is stripped from the crude product along with excess reactant diallylamine in this step. The overhead vapor was condensed by heat exchange against water followed by heat exchange with dry ice immersed in isopropanol alcohol solution. The condensate is primarily water and diallylamine, which can be recycled to a succeeding reaction charge or discarded. The stripped product was cooled to room temperature and filtered with No. 5 Whatman filter paper to remove solids. The filtered product was analyzed as 97.8 wt. percent N,N-diallyldichloroacetamide, 0.3 wt. percent diallylamine and 0.04 wt. percent water. The overall process yield for the reaction, based on the input reactants, was 80.6 wt. percent based on charged dichloroacetyl chloride and 91.1 wt. percent on the basis of diallylamine. Product formulated without gel formation.

EXAMPLE 3

Example 3 was prepared as Example 2 above, except that 1580.8 grams of 17 percent NaOH; 545.9 grams of diallylamine and 573.16 grams of dichloroacetyl chloride was the charge to the reaction vessel. The molar charge ratio was 0.7:1.0:1.2. The reaction temperature was maintained at 28°C and the end point pH was 13.5 to 14. The nitrogen strip was conducted at 67°C for 1 hour. Analysis of the resulting product was 97 wt. percent N,N-diallyldichloroacetamide, 1.1 wt. percent diallylamine and 0.04 wt. percent $H_2O$. The overall process yield based on dichloroacetyl chloride charged was 71.8, and the overall process yield based on diallylamine charged was 87.4 percent. Product formulated without gel formation.

EXAMPLE 4

This example was conducted as Example 2, with the exception that 1550.9 grams 16 percent NaOH, 544.8 grams diallylamine and 710.4 grams dichloroacetyl chloride was charged to the reaction vessel. The molar charge ratio was 0.86:1.0:1.10. The reaction temperature was 29°C and the end point pH was 13 to 13.5. The resulting crude product was stripped at 70°C for 1 hour with nitrogen. The product analysis after stripping was 94 wt. percent N,N-diallyldichloroacetamide, 4.3 wt. percent diallylamine and 0.04 wt. percent water. Overall process yield based on dichloroacetyl chloride charged was 80.4 percent. Product formulated without gel formation.

EXAMPLE 5

Example 5 was conducted as Example 2, except that 1552.1 grams 16 percent of NaOH, 546.1 grams diallylamine and 709.9 grams dichloroacetyl chloride was charged to the reaction vessel. The molar charge ratio was 0.86:1.0:1.09. The reaction temperature was maintained at 51°C and the end point pH was 13 to 13.5. The crude product was stripped for 30 minutes at 71°C with nitrogen. The resulting product was analyzed at 98 wt. percent N,N-diallyldichloroacetamide, 1.1 wt. percent diallylamine and 0.01 wt. percent water. The overall process yield based on dichloroacetyl chloride charged was 79.0 percent. The overall process yield based on diallylamine charged was 95.1 percent. Product formulated without gel formation.

EXAMPLE 6

Example 6 was conducted as Example 2, with the exception that 1551.5 grams of 17.6% NaOH, 546.0 grams diallylamine and 710.7 grams dichloroacetyl chloride was charged to the reaction vessel. The molar charge ratio was 0.86:1.0:1.21. The temperature was maintained at 70°C and the end point pH was 13 to 13.5. The crude product was stripped at 72°C for 33 minutes with nitrogen. The product analysis was 95 wt. percent N,N-diallyldichloroacetamide, 2 wt. percent diallylamine and 0.04 wt. percent water. Overall process yield based on dichloroacetyl chloride charged was 73.9 percent. Overall process yield based on diallylamine charged was 88.2 percent. Product formulated without gel formation.

EXAMPLE 7

Example 7 was conducted as Example 2, except that 1449.7 grams of 16.6% NaOH, 545.2 grams diallylamine and 785.0 grams dichloroacetyl chloride was charged to the reaction vessel. The molar charge ratio was 0.95:1.0:1.10. The reaction temperature was maintained at 0°C and the end point pH was 11 to 11.5. The crude product was stripped for 1 hour at 67°C with nitrogen. Product analysis indicated a yield of 98 wt. percent N,N-diallyldichloroacetamide, 0.2 wt. percent diallylamine and 0.01 wt. percent water. Overall process yield based on dichloroacetyl chloride charged was 74.7 and overall process yield based on diallylamine charged was 92.5 percent. Product formulated without gel formation.

EXAMPLE 8

Example 8 was conducted as Example 2, except that only one-half of the caustic was added to the diallylamine and then one-half of the dichloroacetyl chloride was added to the reaction vessel followed by addition of the other half of the caustic and then the other half of the dichloroacetyl chloride. 511 grams of 48.5% NaOH, 544.4 grams diallylamine and 786.98 grams of dichloroacetyl chloride was charged to the reaction vessel. The molar charge ratio was 0.95:1.00:1.11. The reaction temperature was maintained at 30°C and the end point pH was 13 to 13.5. 949.9 grams of water was added to dissolve precipated salts and form a two-phase mixture. The crude product was stripped for 1 hour at 70°C with nitrogen. Product analysis indicated a yield of 97 wt. percent N,N-diallyldichloroacetamide, 0.6 wt. percent diallylamine, and 0.04 wt. percent water. Overall process yeilds based on dichloroacetyl chloride charged was 88.2 percent. Product formulated without gel formation.

EXAMPLE 9

Example 9 was conducted as Example 8, except that 508.9 grams of 48.5% NaOH, 544.5 grams diallylamine and 784.5 grams of dichloroacetyl chloride was charged to the reaction vessel. The molar charge ratio was 0.95:1.00:1.10. The reaction temperature was maintained at 50°C and the end point pH was 13.0 to 13.5. 941.2 grams water was added to the crude product. The crude product was then stripped. The product analysis indicated a yield of 96 wt. percent N,N-diallyldichloroacetamide and 0.01 wt. percent water. The overall process yield based on dichloroacetyl chloride charged was 87.2 percent. Product formulated without gel formation.

EXAMPLE 10

This example is designed to exemplify the gelling problem associated with product produced at various pH levels.

Into the equipment of Example 2 was placed 595 grams diallylamine and 596 grams of 50 wt.% NaOH (7.45 moles) diluted with distilled water to 1420 grams to produce a 21 wt.% NaOH solution. The mixture was cooled to about 25°C. Addition of dichloroacetyl chloride (DCAC) step-wise with agitation was begun. DCAC addition was stopped at various pH values as the pH decreased due to the reaction and the reaction mixture was sampled at each pH value. Each sample was dried with $MgSO_4$ and filtered. Test formulation of the product at each pH value was made to observe for gelling of the formulation. Results are shown in Table I below.

TABLE I

| Sample No. | pH | Gel Formation |
|---|---|---|
| 1. | 12 | None |
| 2. | 11 | None |
| 3. | 10 | None |
| 4. | 9 | Slight Gel Formation |
| 5. | 8 | Slight Gel Formation |
| 6. | 7 | Thick Gel Formation |
| 7. | 6 | Thick Gel Formation |
| 8. | 5 | Thick Gel Formation |

What is claimed is:

1. In a process for the production of N,N-diallyldichloroacetamide comprising forming a mixture of diallylamine and a suitable inert solvent such as ethylene dichloride, cooling said mixture to −10°C and then slowly adding dichloroacetyl chloride to said mixture under agitation to form a reaction mixture and to effect reaction of the dichloroacetyl chloride with the diallylamine, the improvement comprising forming a mixture of excess diallylamine and from about 5 to about 80 percent aqueous NaOH in the absence of said inert solvent such that at all times during the reaction the pH of the reaction mixture remains above a pH of 10 and adding the dichloroacetyl chloride under violent agitation conditions, while maintaining the temperature of said reaction mixture between from about −10°C to about 100°C, whereby N,N-diallyldichloroacetamide is produced.

2. The process of claim 1 in which the molar charge ratio of dichloroacetyl chloride to diallylamine to 100% NaOH is from about 0.7:1.00:1.05 to about 0.95:1.00:1.25.

3. The process of claim 2 in which the process is conducted at a temperature of from about 0°C to about 70°C.

4. The process of claim 2 in which the process is conducted at a temperature of from about 20°C to about 70°C.

5. The process of claim 2 in which the process is conducted at a temperature of from about 20°C to about 50°C.

6. The process of claim 2 in which the process is conducted at a temperature of about 30°C.

7. The process of claim 2 in which the process is conducted at a molar charge ratio of dichloroacetyl chloride to diallylamine to 100 percent sodium hydroxide of 0.86:1.00:1.10, the aqueous NaOH is from about 18 to about 20% NaOH and the end point pH of the reaction mixture is from about 11 to about 13.

8. The process of claim 1 in which the molar charge ratio of dichloroacetyl chloride to diallylamine to 100% NaOH is from about 0.7:1.00:1.05 to about 0.95:1.00:1.25 and the aqueous NaOH concentration is from about 15 to about 50 percent.

9. The process of claim 8 in which the process is conducted at a temperature of from about 0°C to about 70°C.

10. The process of claim 8 in which the process is conducted at a temperature of from about 20°C to about 70°C.

11. The process of claim 8 in which the process is conducted at a temperature of from about 20°C to about 50°C.

12. The process of claim 8 in which the process is conducted at a temperature of about 30°C.

13. The process of claim 1 in which the molar charge ratio of dichloroacetyl chloride to diallylamine to 100% NaOH is from about 0.7:1.00:1.05 to about 0.95:1.00:1.25 and the aqueous NaOH concentration is from about 17 to about 20 percent.

14. The process of claim 13 in which the process is conducted at a temperature of from about 0°C to about 70°C.

15. The process of claim 13 in which the process is conducted at a temperature of from about 20°C to about 70°C.

16. The process of claim 13 in which the process is conducted at a temperature of from about 20°C to about 50°C.

17. The process of claim 13 in which the process is conducted at a temperature of about 30°C.

18. The process of claim 1 in which the aqueous NaOH is added to the diallylamine in at least two fractions, each fraction of NaOH being followed by addition of an equivalent fraction of the dichloroacetyl chloride.

19. The process of claim 18 in which the process is conducted at a temperature of from about 0°C to about 70°C.

20. The process of claim 18 in which the process is conducted at a temperature of from about 20°C to about 70°C.

21. The process of claim 18 in which the process is conducted at a temperature of from about 20°C to about 50°C.

22. The process of claim 18 in which the process is conducted at a temperature of about 30°C.

23. The process of claim 18 in which the process is conducted at a molar charge ratio of dichloroacetyl chloride to diallylamine to 100 percent sodium hydroxide of .86:1.00:1.09-1.10, the aqueous NaOH is from about 18 percent to about 20% NaOH and the end point pH of the reaction mixture is from about 11 to about 13.

* * * * *